United States Patent [19]
Sanga

[11] 3,875,077
[45] Apr. 1, 1975

[54] METHOD OF AND APPARATUS FOR PRODUCING ACTIVATED CHARCOAL FROM WASTE TIRES

[76] Inventor: Yasuhiro Sanga, 19-26, 5-chome, Shakujiicho, Nerimaku, Tokyo, Japan

[22] Filed: Mar. 28, 1973

[21] Appl. No.: 345,513

[52] U.S. Cl............ 252/425, 23/277 R, 201/2.5, 201/20, 201/25, 202/121, 202/127, 252/421, 252/422, 423/449
[51] Int. Cl............................................ C01b 31/08
[58] Field of Search .......... 252/421, 425, 445, 447; 423/445, 449; 201/2.5, 25; 106/307

[56] References Cited
UNITED STATES PATENTS

| 739,104 | 9/1903 | Ostrejko | 252/425 |
|---|---|---|---|
| 1,502,592 | 7/1924 | Saver | 252/425 |
| 2,516,233 | 7/1950 | McKinnis | 252/421 |
| 3,256,206 | 6/1966 | Doying | 252/421 |
| 3,644,131 | 2/1972 | Gotshall | 106/307 |
| 3,772,242 | 11/1973 | Liska et al. | 252/421 |

OTHER PUBLICATIONS

Canadian Pat. No. 181,179, Abstract Canadian Patent Office Record and Register of Copyrights and Trademarks, Vol. XLV – No. 12, Dec. 31, 1917.

Primary Examiner—Winston A. Douglas
Assistant Examiner—P. E. Konopka
Attorney, Agent, or Firm—Whittemore, Hulbert & Belknap

[57] ABSTRACT

A method of producing activated charcoal comprising the steps of cutting waste tires into small pieces, subjecting these cut pieces of tires to high-temperature heating and burning in an atmosphere shut off from air to perfectly carbonize them, and then activating the charcoal thus produced to obtain activated charcoal, and an apparatus used in carrying out said method.

2 Claims, 1 Drawing Figure

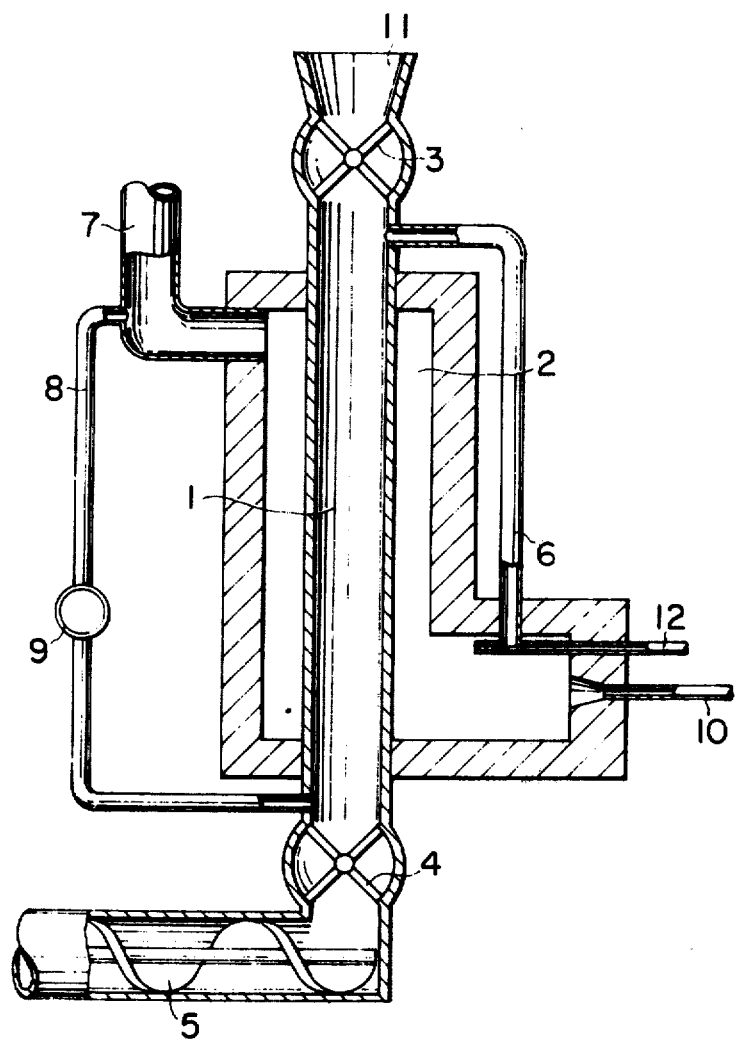

METHOD OF AND APPARATUS FOR PRODUCING ACTIVATED CHARCOAL FROM WASTE TIRES

DETAILED DESCRIPTION OF THE INVENTION

This invention relates to a method of and an apparatus for producing activated charcoal from waste tires, and more particularly to such method and apparatus wherein used tires are first cut into small pieces, then the cut pieces of tires are burnt under high-temperature heating in an atmosphere shut off from air to perfectly carbonize them, and then the charcoal thus obtained is activated to produce activated charcoal.

Heretofore, the scope of utilization of used tires has been very limited. That is, they have been either sunk in water to provide nests for fish or used for land reclamation. But the majority of such used tires have been cut and thrown away or burnt up or incinerated to reduce them into ashes. However, since there are enormous numbers of such used tires, large areas are required for dumping them, and if burned, they produce sulfurous acid gas and other foul-smelling gases which cause air pollution.

There are two methods of producing activated charcoal. One is a chemical activation method in which woody or ligneous powdery materials like sawdust or wood chips are impregnated with an activating agent, such as zinc chloride, and then burnt under heating. The other is a gas activation method in which charcoal, lignite, coal or the like is carbonized under heating and then the charcoal thus produced is brought into contact with steam, carbonic acid gas or air to activate it. In either of these methods, however, woody or ligneous materials or charcoal, all of which are themselves quite valuable as fuel and hence are not obtainable "free," are used as base materials.

The raw material used in the present invention is obtained for nothing because waste tires are used as the raw material, and hence activated charcoal can be produced at a low cost. The present invention is also of great significance in that useful and high quality activated charcoal can be obtained from waste tires which pose many difficult problems in their disposal.

According to one embodiment of the present invention, waste tires are first cut into small pieces and these pieces are then introduced in a kiln and subjected to pyrolysis at a temperature of approximately 800° C in an atmosphere shut off from air to effect carbonization. The thus obtained charcoal is then activated by contact with steam or carbonic acid gas at a temperature of 900° to 1,000° C. An activated charcoal having excellent adsorptive capacity is obtained at a yield of 15 to 20% by weight of the total amount of waste tires used.

According to another embodiment of the present invention, waste tires are cut into small pieces, which are then placed together with lime stone in a kiln, a reaction chamber, and are heated at a temperature of below 800° C in an atmosphere from which air is excluded to thereby pyrolytically carbonize the tires. Preferably, the combustible gases produced during this treatment are introduced into a heat combustion furnace, as heater, for use as part of fuel. Generally, the proportion of waste tires to lime stone that is fed into the kiln is within the range of 1:1 to 1:2, preferably 1:1.5 to 1:2.0 by weight ratio, but the carbonization time can be suitably selected according to the situation. Thus waste tires cut into small pieces are thoroughly changed into carbon by burning in the kiln. After the tires are carbonized, the temperature in the kiln is raised to above 825° C, whereby the lime stone is calcined and it is decomposed into quick lime and carbonic acid gas. The carbonic acid gas reacts with carbon in the kiln to become carbon monoxide. Namely, the following reactions take place in the kiln, the reaction chamber:

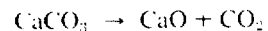
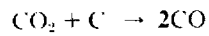

The $CO_2$ gas produced from lime stone through the first reaction functions to activate the charcoal in the kiln while at the same time reacting with the charcoal to become carbon monoxide. This carbon monoxide is introduced into the combustion furnace for use as part of the fuel. More than two hours of activation time is required. According to the present invention, charcoal is obtained at a yield of 35 to 40% by weight of the waste tires used. When this charcoal is treated by the above-said activation method using lime stone and if the charcoal is burnt off to activate to about 50% of its weight, then there can be obtained activated charcoal having a very high adsorptive efficiency. This activation reaction produces a mixture of high-quality activated charcoal and quick lime. This mixture, after cooling, is taken out and separated by air elutriation or other like methods to obtain activated charcoal and quick lime.

According to the present invention, in the carbonization and activation of waste tires, carbonized gas of the raw material (waste tires) can be utilized as fuel for the heater, and it is also possible to use a carbonization-activation furnace in which part of the exhaust combustion gas is circulated in the system for reuse as the activating gas. That is, in the carbonization-activation apparatus of the present invention a conduit for carbonized gas in the tire burning and activating reaction chamber opens into the combustion furnace for heating and a conduit of exhaust gas in said combustion furnace opens into said reaction chamber.

The carbonization-activation apparatus of the present invention is described in detail with reference to the accompanying drawing which shows schematically a partly cut-away front view of the apparatus.

BRIEF DESCRIPTION OF THE DRAWING

FIG. 1 is a partly cut away schematic view of the carbonization-activation apparatus of the present invention.

A vertical cylindrical reaction chamber 1 is provided in a combustion furnace 2, with a rotary feeder 3 being provided at the top of said reaction chamber 1, and with a rotary valve 4 and a screw conveyor 5 being provided at the bottom of said chamber. A conduit 6, opens at its one end into an upper part of the reaction chamber 1, and opens at its other end into the combustion chamber 2. Conduit 8 opens at its one end into an exhaust pipe 7 of the combustion furnace 2 and opens at its other end into a lower part of the reaction chamber 1 through an air blower 9. An auxiliary combustion burner 10 is provided in the combustion furnace 2.

In use of this apparatus, first the feeder 3 is opened and the valve 4 is closed, then the mixture of small pieces of waste tires, which have been cut to 5 to 10 cm² in size, and the lime stone which is used as the activating agent is fed into the reaction chamber 1 from hopper 11 alternately the lime stone and the cut pieces of waste tires are fed successively portionwise in the form of layers from said hopper 11. Then, the auxiliary combustion burner 10 is ignited to heat the interior of the combustion furnace 2 to 400° to 800° C, whereby the tire pieces in the reaction chamber 1 begin to decompose pyrolytically producing carbonized gas. This carbonized gas is removed through the conduit 6 and then passed into the combustion furnace 2 along with air supplied from an air supply pipe 12, thereby being completely burned in the furnace 2. Carbonization is completed in 30 to 60 minutes and the tire pieces are perfectly carbonized. Heating of the auxiliary combustion burner 10 is then intensified to raise the temperature to above 825° C, which is the decomposition point of lime stone. Such temperature may for instance, be raised to 900° to 950° C to promote the decomposition of the lime stone and the activation reaction by the cracked gas in the reaction chamber. In the aforementioned reactions, $CO_2$ gas is pyrolytically produced from lime stone and this $CO_2$ gas activates the tire charcoal and is in turn itself reduced to carbon monoxide. This carbon monoxide is taken out through conduit 6 and is mixed with air from air supply pipe 12 and burned in the combustion furnace 2. Combustion gas produced in said furnace is discharged through exhaust pipe 7 toward a stack. As carbonization of the tires is completed and the process further proceeds to the step of activation of the charcoal, part of the exhaust gas is passed through conduit 8 and air blower 9 to return into the reaction chamber 1 from the lower part thereof to serve as an aid to the activation gas. That is, the carbon monoxide produced in the activation step is taken out through conduit 6 into combustion furnace 2 where said gas is burned and combined with oxygen to become carbonic acid gas, and this carbonic acid gas is re-utilized as part of the activating gas. The reaction products obtained in the activation treatment are discharged through the opened rotary valve 4 and carried away on the screw conveyor 5 into a cooling chamber. After cooling said cooling chamber the processed mass is separated by air elutriation into activated charcoal and quick lime.

In the methods of the present invention the raw material is obtained for nothing as such raw material is waste tires, and hence high-quality activated charcoal can be produced at extremely low cost. A further advantage of the present invention lies in the fact that the charcoal, which is becoming more and more difficult to obtain lately, or coal, which is itself valuable as a fuel for various purposes, is not consumed as raw material. The present invention is thus beneficial in conserving natural resources. Moreover, in the case of burning waste tires by mixing lime stone therewith, the carbonization and activation processes can be accomplished in one step, thus greatly simplifying the treating process. Furthermore, since the combustible gases produced in the process can be utilized for heating the raw material fuel costs are reduced, and, as an additional benefit, quick lime is obtained as a by-product. Particularly, when using the carbonization-activation apparatus of the present invention, carbon monoxide produced in the reaction chamber during the activation treatment of the waste tires is guided into the combustion furnace and is used as part of the fuel for heating the reaction chamber. Likewise, the carbonic acid gas produced from the combustion of fuel is guided into the reaction chamber and is used for promoting activation. Thus, the exhaust gases are effectively utilized to realize extreme economy of the material cost and the obtainment of the desired products at an extremely low cost.

The present invention is now described in further particulars by way of practical examples thereof.

EXAMPLE 1

A used tire for normal passanger cars was cut into small pieces of about 30 mm or less in size, and 300 gr of such cut tire pieces were charged into the center of a stainless steel reaction tube 75 mm in inner diameter and 1 m in length. This reaction tube was placed in a horizontal electric heating type muffle kiln and heated at 700° C for 60 minutes in an atmosphere which was shut off from outside air to effect carbonization. Then the temperature was raised to 950° C and steam was blown into said reaction tube from one end thereof for 10 minutes and then suspended for another 10 minutes, this 10-minute steam blow-in and suspension being continued alternately for a total duration of 90 minutes to thereby effect activation of the material. During this period, steam had been supplied in a total amount of about 300 gr. Thereafter, the reaction tube was pulled out from the kiln and, after cooling, the content in the reaction tube were taken out. 48 gr of activated charcoal were obtained. This activated charcoal could decolorize a 0.12% Methylene Blue solution at the rate of 16 cc per 0.1 gr of activated charcoal.

EXAMPLE 2

300 gr of cut pieces (about 30 mm or less in size) of used tires for normal passenger cars were charged into the same reaction tube as used in Example 1, and then this reaction tube was placed in an electric heating kiln, also the same as in Example 1, and heated at 700° C for 60 minutes by shutting off the air to effect carbonization. Thereafter, the kiln temperature was raised to 970° C and about 200 liter of carbonic acid gas was introduced into said reaction tube for 120 minutes to achieve activation. After cooling, the contents of the reaction tube were removed and 60 gr of activated charcoal was obtained. This activated charcoal could decolorize the Methylene Blue solution at the rate of about 14 cc per 0.1 gr of charcoal.

EXAMPLE 3

A mixture of 12 kg of used tires for normal passenger cars, which had been cut to about 50 mm² size, and 12 kg of lime stone was charged into a carborundum made crucible which was 30 cm in inner diameter and 40 cm in height. After being covered with a cover, said crucible was placed in a heavy oil furnace and heated at 800° C for 1 hour to effect carbonization, followed by an additional 40 hours calcination at 950° C. After cooling, the contents were taken out and subjected to air elutriation to obtain 2.7 kg of activated charcoal and 6.8 kg of quick lime. This activated charcoal could decolorize a 0.12% Methylene Blue solution at the rate of 15 cc per 0.1 gr of activated charcoal.

EXAMPLE 4

A mixture of 10 kg of cut pieces (about 50 mm² in size) of used tires for ordinary passenger cars and 17 kg of lime stone was charged into the same crucible as used in Example 3, and then this crucible was placed in a heavy oil furnace and heated at 800° C for 40 minutes to effect carbonization, followed by an additional 4-hour-and-20-minute calcination at 970° C. After cooling the contents were taken out and subjected to air elutriation to obtain 2 kg of activated charcoal and 9.5 kg of quick lime. This activated charcoal could decolorize a 0.12% Methylene Blue solution at the rate of 20 cc per 0.1 gr of the activated charcoal.

EXAMPLE 5

Cut pieces (about 50 mm² in size) of used tires for standard passenger cars and lime stone, both in equal amounts were charged into a carbonization-activation apparatus such as that shown in the drawing, and the interior of the combustion furnace was heated to 800° C to effect carbonization for 1 hour. During this period, the gases produced pyrolytically from the burned tires were introduced into the combustion furnace in the manner described above. Then, the temperature was raised to 900° to 950° C and maintained at that level for 5 hours to induce cracking of the lime stone and a charcoal activation reaction occurred induced by the resulting cracked gas. Carbonic acid gas in the exhaust combustion gas was introduced back into the reaction chamber where it was utilized as an activating gas. The treated substance taken out from the reaction chamber was subjected to air elutristion to obtain activated charcoal. The yield was 21% by weight of the total amount of tires used as the raw material. This activated charcoal could decolorize a 0.12% Methylene Blue solution at the rate of 15 cc per 0.1 gr of the activated charcoal.

The yield of quick lime, which was also obtained as a final product, was 57% by weight of the total amount of lime stone used as the starting raw material in the admixture with the waste tires.

What is claimed is:

1. A method of producing activated charcoal comprising the steps of cutting waste tires into small pieces, adding thereto limestone in a weight ratio between 1.5 to 1 and 2.0 to 1, subjecting the mixture to heating in an atmosphere shut off from air to perfectly carbonize the tire material at a temperature below the decomposition point of the limestone to form about 35 to 40% by weight of charcoal based on the weight of said waste tires, further raising the temperature to above said decomposition point to effect calcination and to pyrolytically produce carbonic acid gas which reacts with said charcoal to reduce the charcoal weight by about 50% while activating the charcoal, and then separating the activated charcoal from the treated mixture mass.

2. A method according to claim 1 in which the heating of said mixture is provided by a combustion furnace into which fuel and air are introduced, and the carbon monoxide produced as a by-product from said reaction of carbonic acid gas with the charcoal is introduced into said combustion furnace for use as part of said fuel, and said separation of the activated charcoal from the calcined limestone is effected by air elutriation.

* * * * *